United States Patent Office 3,373,237
Patented Mar. 12, 1968

3,373,237
METHOD OF FORMING DELUSTERED SHAPED ARTICLES OF SYNTHETIC RESINS
John A. Mihalik, Swarthmore, and Alfred H. Stewart, Jr., Collingdale, Pa., assignors to FMC Corporation, Philadelphia, Pa., a corporation of Delaware
No Drawing. Filed June 22, 1964, Ser. No. 377,123
5 Claims. (Cl. 264—316)

ABSTRACT OF THE DISCLOSURE

A method of forming delustered shaped articles of synthetic resins wherein an easily releasable sheet comprising a non-fibrous cellulosic sheet impregnated with finely-divided rubber particles is employed, is disclosed herein.

Certain manufacturing procedures for the formation of molded and cast synthetic resin articles require the use of easily releasable films. These films, for example, regenerated cellulose film, are used between a molding surface and the molded resin to effect easy release from the mold after the resin has hardened, or the film itself is employed as a carrier base for the casting of resin sheets and the like and may be eventually stripped from the finished article.

It is often desirable in such processes to modify the appearance of the formed resin article by reducing the gloss or luster of its surface. In the past it has been necessary to incorporate a delustering agent into the resin mass prior to forming the article or to treat the surface of the finished article with a delustering agent.

It is a primary object of this invention to provide a simple method of forming a synthetic resin article having reduced gloss and which is easily released from a mold or a casting surface.

It is another object of this invention to provide a method of making uniformly impregnated cellulose film with a rubber latex material.

These and other objects are accomplished in accordance with the present invention wherein a cellulosic film impregnated with finely-divided rubber particles is employed as an easily releasable sheet in contact with the resin in a method of forming a synthetic resin article.

The more common method of incorporating a foreign substance in the cellulosic solution wherein the substance is admixed with a batch of viscose or other cellulosic solution in a vessel prior to its use in the manufacture of the film, is not suitable for the preparation of an acceptable product for this invention. This is probably because of the instability of the latex in the cellulosic film-forming solution. Incorporation of the latex by injection into the stream of cellulosic solution at a specified rate as it passes to the shaping nozzle is necessary to obtain a uniformly impregnated film having rubber particles of more uniform size which film, in turn, imparts a more uniformly deglossed and commercially acceptable surface to the resin article with which it is in contact.

Rubber, within the purview of this invention, includes both natural and synthetic elastomers capable of forming a stable dispersion or latex in an aqueous medium. Natural rubber includes, for example, caoutchouc, balata, gutta-percha, pale crepe, etc. Synthetic rubber includes for example, elastomeric polymers of vinyl pyridine, butadiene-1,3, isobutylene, 2-chloro-butadiene-1,3, isoprene and the like, as well as interpolymers of these and similar materials with each other or with interpolymerizable monomers as styrene, acrylonitrile, methacrylonitrile, methyl methacrylate, ethyl methacrylate, alkyl substituted vinyl pyridines, etc. Mixtures of any of the above rubber materials may be used in forming a latex. Latex stabilizers and rubber compounding materials such as pigments, softeners, vulcanizers, accelerators and antioxidants are also permissably present.

Amounts of the rubber particles in the latex range from about 10 to 60% by weight and preferably from about 20 to 50%.

Synthetic elastomers may be formed in an emulsion polymerization procedure and used as such for a latex in the preparation of a film for this invention.

Many suitable natural and synthetic rubber latex compositions are available on the open market.

The films for this invention are produced by injecting a rubber latex at a suitable rate into a solution of the cellulosic film-former just prior to extrusion in the form of a film. The latex-solution mixture is then extruded into a series of coagulating and processing baths in a conventional manner to obtain the film. Obviously the solvent for the film-former or the solution per se should not be capable of any appreciable solvent action on the rubber particles. In the preferred form of the invention the latex is injected into a viscose stream which is then extruded in the form of a film into a coagulating and regenerating bath.

Other film-formers inclined are suitable cellulose ethers and esters.

In general, latexes containing from 10 up to about 60% solids by weight are injected into the viscose in an amount to provide a viscose having from about 0.1 to about 3.5% solids and preferably from about 0.3 to about 2.5% solids therein. The finished film then contains a percentage of fine rubber particles within the range of from about 1 to 35% and preferably from about 3 to 20% based on the weight of the film.

The film for this invention provides an easily releasable, deglossing surface for molded and cast resins. Of primary interest for this invention are thermosetting resins; however, the invention is also applicable to thermoplastic resins from which delustered articles are to be produced.

Thermosetting resins include, for example, unsaturated polyester type resins which result from the reaction of a polyhydroxy compound and a polybasic acid and have reactive groups remaining in the molecule which will react when heated or in the presence of a catalyst or curing agent to form an infusible product, e.g., reaction product of glycerol and phthalic anhydride, reaction products of unsaturated dibasic acids including maleic, fumaric, itaconic, citraconic, or mesaconic with a dihydric alcohol including the polymethylene glycol series from ethylene glycol to decamethylene glycol and the polyethylene glycol series from diethylene glycol to nonaethylene glycol, dipropylene glycol, glycerol monoesters, glycerol and pentaerythritol. Modifiers may be added to the above thermosetting resins which copolymerize therewith when the resin is cured. Such modifying materials include polymerizable hydrocarbons containing a $CH_2=C<$ linkage such as styrene, cyclopentadiene and divinyl benzene. Phenol-formaldehyde precondensates and novolaks which may be thermoset by heating or with the addition of a curing compound are useful as well as urea-formaldehyde precondensates, melamine-formaldehyde precondensates and aminoplast molding resins in general, all of which may be cured with heat, curing agents or both, and epoxy resins, as typified by the reaction of bisphenol A and epichlorohydrin, which are quickly cured with heat and/or curing agents, etc.

Thermoplastic resins include, for example, polystyrene, acrylic resins, e.g., polymers of acrylic acid, methacrylic acid and alkyl esters thereof; acrylonitrile polymers, vinyl resins, e.g., vinyl chloride-vinyl acetate copolymers, polymers of vinylidene chloride and another monomer; polyolefins, e.g., ethylene, propylene and isobutylene polymers; polycarbonates, polyamides, polyesters, polyvinyl chloride, etc.

These resins may be mixed with fillers including wood, flour, cotton floc, glass fibers, metallic filaments and particles, silicate fibers and particles, synthetic resin fibers and particles, rubber particles, asbestos fibers, mica particles, cellulose fibers, crystalline cellulose and the like. The resin may be used to impregnate fibrous sheets either woven or non-woven. Dyes, pigment and coloring agents are also used therein.

The following examples are set forth to demonstrate the method of this invention.

*Example I*

Regenerated cellulose test films containing various amounts of finely-divided rubber particles were prepared by injecting latexes of natural rubber having varying solids concentrations into the viscose stream just prior to extrusion. The viscose films were otherwise spun in a conventional manner.

These films were used in the preparation of polyester plastic panels which were then measured for gloss. The panels were prepared by first placing a sheet of the test film (12 in. by 12 in.) on a flat surface and pouring a small amount of a catalyzed resin on the center of the film.

The resin mixture was prepared by adding 4 gms. of a mixture of 1 part benzoyl peroxide and 1 part tricresyl phosphate to every 100 gms. of a thermosetting unsaturated polyester resin. This was mixed and allowed to stand for one hour prior to use.

A sheet of wood pulp (3 in. by 5 in.) was placed over the catalyzed resin and allowed to become saturated. Another small amount of the resin was poured over the pulp sheet and another sheet of the test film was placed over the resin.

Excess resin was squeezed from the wet laminate with a metal hand roller and the composite sheet placed in a hoop frame and tightly secured. This assembly was placed in an oven at 190° F. for about 10 minutes at which time the resin had gelled. The assembly was removed from this oven and placed in another oven at 275° F. for one minute. The laminate was removed from the oven, permitted to cool and removed from the hoop frame. The top and bottom films were peeled away to provide a panel ready for gloss measurements.

Gloss measurements were made using a conventional 60° Gardner glossmeter which was calibrated within ±2 units using a highly polished standard (94 reading) and a lower gloss standard (42 reading). At least three readings were made in each direction for each test panel. The following table shows the gloss measurements for test panels prepared with the above-described release films containing various amounts of finely-divided rubber particles.

TABLE I

| Rubber particle content, based on film weight, percent | Gloss reading |
|---|---|
| None | 95–100 |
| 3.2 | 45–60 |
| 4.6 | 20–30 |
| 20.0 | 5 |

*Example II*

Regenerated cellulose films were prepared and used in the preparation of polyester plastic panels as described in Example I. The thermosetting unsaturated polyester resin was the reaction product of polyoxyethylene isopropylidene diphenol and fumaric acid anhydride mixed with an equal proportion of styrene.

Gloss measurements were made using a 45° and 20° glossmeter. The following table shows the gloss measurements for test panels prepared with the above-described release films containing various amounts of rubber particles.

TABLE II

| Rubber particle content, based on film weight | Gloss reading— | |
|---|---|---|
| | 45° | 20° |
| None | 51–52 | 45–46 |
| 4.8% | 34 | 9.5 |
| 20.0% | 9.6 | 1.0 |

An embodiment of this invention which is continuous involves, for example, the running together of an inexpensive continuous base pellicle such as glassine, cellophane or wax paper with a resin dipped web of pulp. A resin dipped design sheet of paper or the like is then run together with the pulp sheet and finally a pellicle of the release film containing an amount of rubber particles to deluster as desired, is brought in contact with the composite sheet. The laminate is then run through one or more sets of rolls and one or more heating zones to cure the resin. Panels of the laminate are then cut and stored. When ready for use the front surface film is easily peeled away to reveal a surface of the desired appearance.

Various changes and modifications may be made practicing the invention without departing from the spirit and scope thereof and, therefore, the invention is not to be limited except as defined in the appended claims.

We claim:
1. In a method of forming a synthetic resin article wherein a hardenable resin is brought into contact with an easily releasable sheet, the resin permitted to harden and said sheet eventually removed from said article, the improvement which comprises employing a non-fibrous cellulosic sheet impregnated with finely-divided rubber particles as said releasable sheet whereby said resin article has a reduced luster on removal of said sheet, said non-fibrous cellulosic sheet having been prepared by injecting a rubber latex at a rate sufficient to incorporate from 1 to 35% by weight of rubber particles in said sheet, into a cellulosic film-forming solution just prior to the extrusion of said solution in the form of a sheet into a coagulating medium.
2. The method of claim 1 wherein said hardenable resin is a thermo-setting resin.
3. The method of claim 1 wherein the hardenable resin is a thermoplastic resin.
4. The method of claim 1 wherein the cellulosic sheet is a regenerated cellulose film.
5. The method of claim 4 wherein the regenerated cellulose film contains from 3 to 20% by weight of finely-divided rubber particles and said rubber is natural rubber.

References Cited

UNITED STATES PATENTS 2,596,162   5/1952   Muskat _____ 161—406
2,652,597   9/1953   Sucher _____ 264—316

ROBERT F. WHITE, *Primary Examiner.*

G. AUVILLE, *Assistant Examiner.*